(12) United States Patent
Trim et al.

(10) Patent No.: US 11,934,434 B2
(45) Date of Patent: Mar. 19, 2024

(54) SEMANTIC DISAMBIGUATION UTILIZING PROVENANCE INFLUENCED DISTRIBUTION PROFILE SCORES

(71) Applicant: International Business Machines Corporation, Armonk, NY (US)

(72) Inventors: Craig M. Trim, Ventura, CA (US); Michael Bender, Rye Brook, NY (US); Mauro Marzorati, Lutz, FL (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 16/543,096

(22) Filed: Aug. 16, 2019

(65) Prior Publication Data
US 2021/0049196 A1     Feb. 18, 2021

(51) Int. Cl.
*G06F 16/33*     (2019.01)
*G06F 16/35*     (2019.01)
*G06F 40/30*     (2020.01)

(52) U.S. Cl.
CPC ...... *G06F 16/3347* (2019.01); *G06F 16/3334* (2019.01); *G06F 16/35* (2019.01); *G06F 40/30* (2020.01)

(58) Field of Classification Search
CPC .. G06F 16/1744; G06F 16/901; G06F 16/156; G06F 16/3347; G06F 16/3334; G06F 16/35; G06F 40/30; G06N 3/08; G06N 3/0454; G06N 3/084; G06N 3/063; H03M 7/30; H03M 7/6023; H03M 7/3059; H03M 7/6005; G06T 9/002; G06T 15/005; G06T 15/10; G06T 2207/20081; G06T 2207/20084
See application file for complete search history.

(56) References Cited

U.S. PATENT DOCUMENTS

| | | | |
|---|---|---|---|
| 6,405,162 | B1 | 6/2002 | Segond et al. |
| 7,272,597 | B2 | 9/2007 | Chowdhury et al. |
| 7,809,660 | B2 | 10/2010 | Friedlander et al. |
| 7,930,262 | B2 | 4/2011 | Friedlander et al. |

(Continued)

OTHER PUBLICATIONS

Lievski et al., "Semantic Overfitting: What 'World' Do We Consider When Evaluating Disambiguation of Text?", 26th International Conference on Computational Linguistics, 2016.

(Continued)

*Primary Examiner* — Richard L Bowen
*Assistant Examiner* — Aryan D Toughiry
(74) *Attorney, Agent, or Firm* — Heather Johnston (57) ABSTRACT

Disambiguation of search keywords to expert systems is performed through the application of a semantic ranking function to determine a classification category with confidence for a given query. The semantic ranking function is executed through an application of a semantic distance distribution profile score through analysis of user problem statement (UPS) with nodes in the taxonomy in the same vector space to create a search that combines a user problem statement and a taxonomical node in the search engine index. The distribution profile score calculation is provenance influenced to derive geographic, cultural, and demographic provenance for a user problem statement.

20 Claims, 4 Drawing Sheets

(56) References Cited

U.S. PATENT DOCUMENTS

| | | | |
|---|---|---|---|
| 8,055,603 B2 | 11/2011 | Angell et al. | |
| 2004/0208315 A1* | 10/2004 | Kilbank | H03M 7/30 |
| | | | 380/37 |
| 2009/0157652 A1* | 6/2009 | Barbosa | G06F 16/3347 |
| | | | 707/999.005 |
| 2010/0030723 A1 | 2/2010 | Au | |
| 2013/0197900 A1 | 8/2013 | Rotbart et al. | |
| 2013/0325831 A1* | 12/2013 | Bao | G06F 16/2428 |
| | | | 707/706 |
| 2016/0239483 A1 | 8/2016 | Bishop et al. | |
| 2018/0174085 A1* | 6/2018 | McCoy | G06Q 30/016 |
| 2018/0285457 A1 | 10/2018 | Pulbere et al. | |
| 2018/0349377 A1* | 12/2018 | Verma | G06F 16/248 |
| 2020/0285687 A1* | 9/2020 | Zhang | G06F 16/9574 |
| 2021/0005316 A1* | 1/2021 | Neumann | G06F 40/35 |

OTHER PUBLICATIONS

Menarini et al. "Green Web Services: Improving Energy Efficiency in Data Centers via Workload Predictions", Greens 2013.

Dumitru et al. "Dynamic Management Techniques For Increasing Energy Efficiency within a Data Center"; UNITE Doctoral Symposium; May 2013.

Mohammand, Saif "Measuring Semantic Distance using Distributional Profiles of Concepts". https://saifmohammad.com/WebDocs/Mohammad_Saif_Thesis-slides.pdf; at least as early as Aug. 2019.

* cited by examiner

SEMANTIC DISAMBIGUATION UTILIZING PROVENANCE INFLUENCED DISTRIBUTION PROFILE SCORES

BACKGROUND

The present invention relates to disambiguation, and more specifically to semantic disambiguation utilizing provenance influenced distribution profile scores.

Disambiguation refers to the process of identifying which meaning of a word is used in a given context. For example "Python" can mean an animal or a programming language. "Orange" can mean a fruit or a color.

Disambiguation of search terms is key when querying an expert system. Most user queries to expert systems are underspecified. By some estimates, the average expert system query consists of just 2.7 keywords in length. Underspecified search query keywords make it difficult to establish context and therefore perform accurate disambiguation of the words within the search query.

Traditionally expert systems perform disambiguation of search keywords using methods such as: domain assumptions, and user clarification. Domain assumptions uses the deployment location of the expert system trends disambiguation to that vertical. For example, an expert system deployed in a telco vertical assumes a telco interpretation of search keywords. User clarification asks the user to manually qualify any ambiguation of keyword query terms.

Traditional expert systems have significant limitations, and do not offer a satisfying solution.

In traditional expert systems it is common to approach the challenge of query classification using machine learning techniques. To build a probabilistic model, data needs to be gathered first. Data is typically pulled and integrated from multiple external sources, such as dbpedia and other wilds, log data and any other form of web crawling that may capture relevant data. The data is processed in order to obtain additional features for short queries and training data.

The disadvantages to these approaches is that while they are familiar and well-understood by the industry, they are slow to adapt to changes within the target category taxonomy. If the target taxonomy changes, then the entire suite of classification buckets has changed, and the machine learning process of building and annotation a ground truth corpora large enough to be helpful has to start over. This is a time-consuming and expensive process. And unless one is building a classifier within a static domain, which is unusual, it is a problem that commonly occurs in the long-term but is rarely estimated for in the short-term.

SUMMARY

According to one embodiment of the present invention, a method of utilizing provenance influenced distribution profile scores to execute a search of a user query is disclosed. The method comprising the steps of: a computer receiving a user query including a user problem statement; the computer analyzing the user query and associated user problem statement to create an applicable vector space with vectors having values representing the user problem statement; the computer applying a taxonomy to the vectors and the values representing the user problem statement within the applicable vector space to create an enhanced user problem statement represented within the applicable vector space by enhanced vectors and values; the computer deriving at least a provenance to calculate a provenance influenced distribution profile score of the enhanced user problem statement based on the values of the enhanced vectors of the enhanced user problem statement; the computer executing a search of the query represented by the enhanced user problem statement and the provenance influenced distribution profile score; and the computer returning search results from the executed search to the user.

According to another embodiment of the present invention, a computer program product for utilizing provenance influenced distribution profile scores to execute a search of a user query with a computer. The computer comprising at least one processor, one or more memories, one or more computer readable storage media, the computer program product comprising a computer readable storage medium having program instructions embodied therewith. The program instructions executable by the computer to perform a method comprising: receiving, by the computer, a user query including a user problem statement; analyzing, by the computer, the user query and associated user problem statement to create an applicable vector space with vectors having values representing the user problem statement; applying, by the computer, a taxonomy to the vectors and the values representing the user problem statement within the applicable vector space to create an enhanced user problem statement represented within the applicable vector space by enhanced vectors and values; deriving, by the computer, at least a provenance to calculate a provenance influenced distribution profile score of the enhanced user problem statement based on the values of the enhanced vectors of the enhanced user problem statement; executing, by the computer, a search of the query represented by the enhanced user problem statement and the provenance influenced distribution profile score; and returning, by the computer, search results from the executed search to the user.

According to another embodiment of the present invention, a computer system for utilizing provenance influenced distribution profile scores to execute a search of a user query comprising a computer executing the search of the user query. The computer comprising at least one processor, one or more memories, one or more computer readable storage media having program instructions executable by the computer to perform the program instructions. The program instructions comprising: receiving, by the computer, a user query including a user problem statement; analyzing, by the computer, the user query and associated user problem statement to create an applicable vector space with vectors having values representing the user problem statement; applying, by the computer, a taxonomy to the vectors and the values representing the user problem statement within the applicable vector space to create an enhanced user problem statement represented within the applicable vector space by enhanced vectors and values; deriving, by the computer, at least a provenance to calculate a provenance influenced distribution profile score of the enhanced user problem statement based on the values of the enhanced vectors of the enhanced user problem statement; executing, by the computer, a search of the query represented by the enhanced user problem statement and the provenance influenced distribution profile score; and returning, by the computer, search results from the executed search to the user.

DETAILED DESCRIPTION

In an embodiment of the present invention, disambiguation of search keywords to expert systems is performed through the application of a semantic ranking function to determine a classification category with confidence for a given query. The semantic ranking function is executed through an application of a semantic distance distribution profile score through analysis of user problem statement (UPS) with nodes in the taxonomy in the same vector space to create a search that combines a user problem statement and a taxonomical node in the search engine index. The distribution profile score calculation is provenance influenced to derive geographic, cultural, and demographic provenance for a user problem statement. In this embodiment, "provenance" refers to place or origin. In an embodiment of the present invention, the place of origin of a word used in a user problem statement relates to its geographic origin (given word's usage and meaning which could differ by region), cultural origin (differences in cultural use of a work, regardless of geographic location), and demographic origin (different uses of the word by different subsets of a population).

It will be recognized that in an embodiment of the present invention "ground truth" or manually labeled training data is not gathered as an initial corpus. "Ground truth" is time consuming to gather and often the amount of the time to gather a comprehensive corpus is limited and not practical.

In an embodiment of the present invention, a taxonomy or ontology is used as a basis for a vector space. By placing a user problem statement and each node of the taxonomy or ontology in the same vector space, the probability of a user problem statement belonging to or being similar to a node of the taxonomy or ontology represents similarity between two words or sets of words. A search can then be created that combines the user problem statement and the node of the taxonomy or ontology in the search engine index. When the taxonomy or ontology changes, the probabilities relative to the same user problem statement change and the vector space can shift appropriately, eliminating re-training when the target taxonomy changes.

Figure 1:
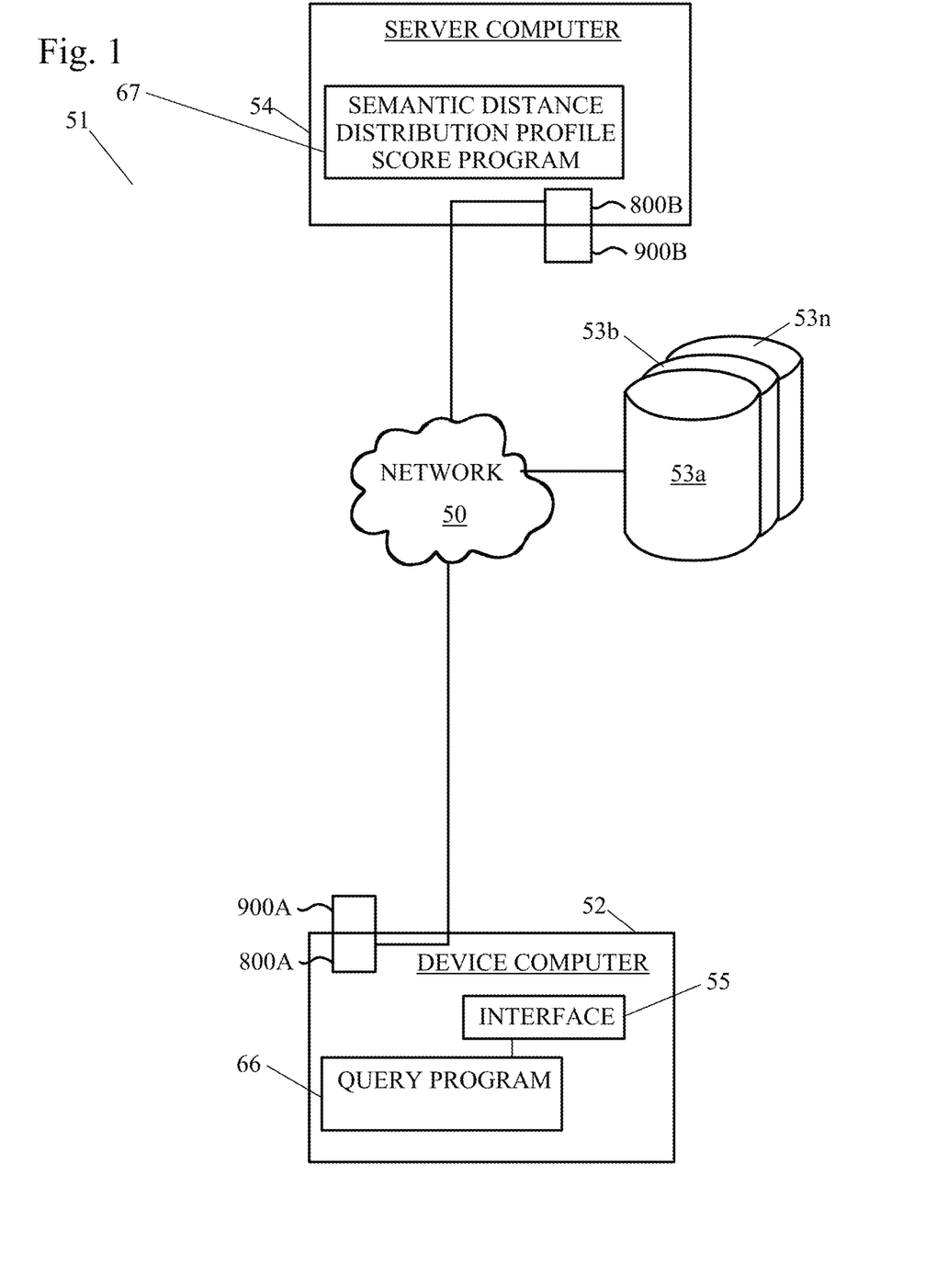
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables. The network data processing system 51 may be a cognitive system which uses probability to determine an answer and/or the answers are given with a likelihood score.

In the depicted example, device computer 52, at least one repository 53a-53n, and a server computer 54 connect to network 50. In other exemplary embodiments, network data processing system 51 may include additional client or device computers, storage devices or repositories, server computers, and other devices not shown.

The device computer 52 may contain an interface 55, which may accept commands and data entry from a user. The commands may be regarding a search query to be executed and/or a user problem statement. The interface 55 can be, for example, a command line interface, a graphical user interface (GUI), a natural user interface (NUI) or a touch user interface (TUI). The device computer 52 may include query program 66. While not shown, it may be desirable to have the query program 66 present on the server computer 54. The device computer 52 includes a set of internal components 800a and a set of external components 900a, further illustrated in FIG. 2.

Figure 2:
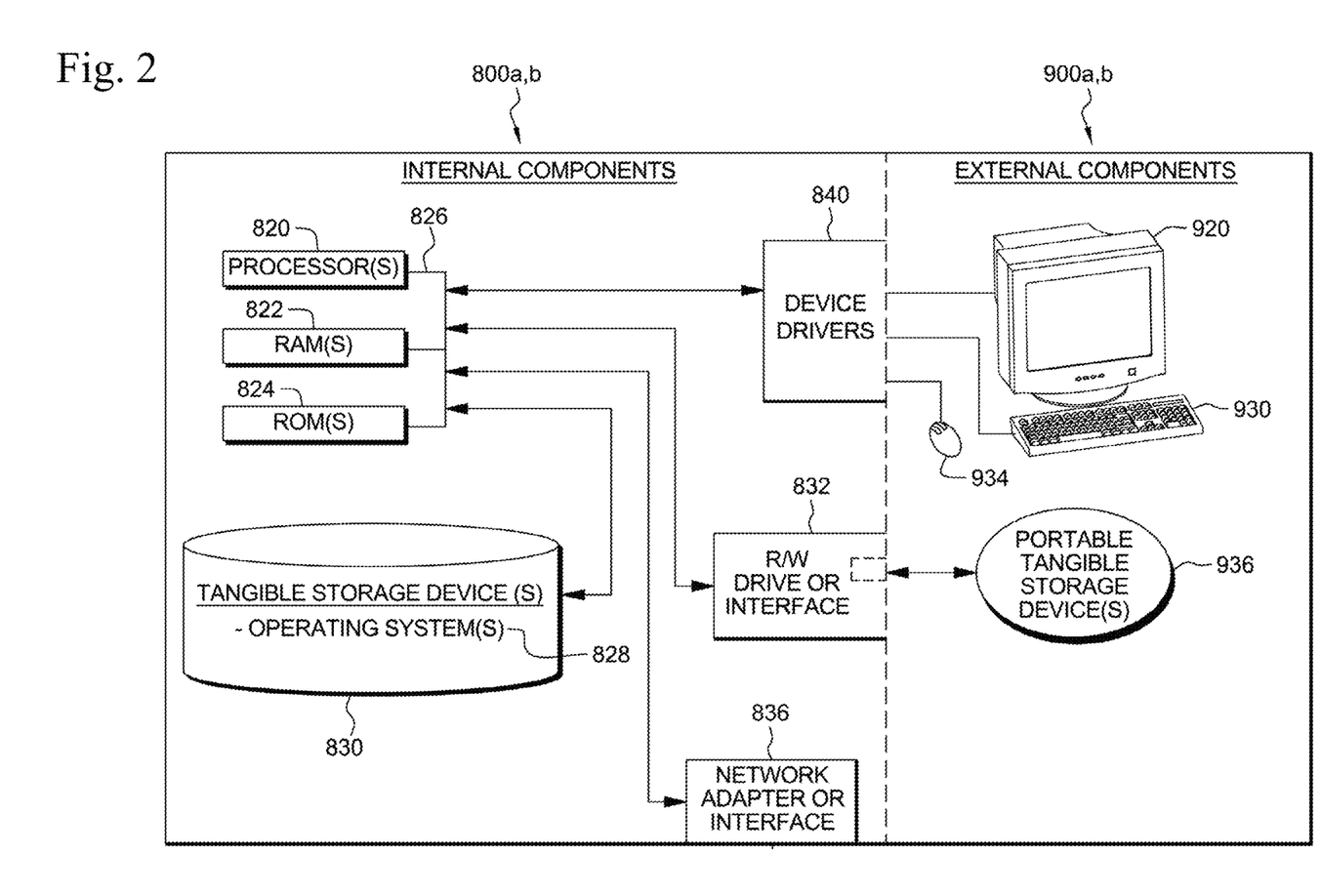
FIG. 2 illustrates internal and external components of a client computer and a server computer in which illustrative embodiments may be implemented.

Server computer 54 includes a set of internal components 800b and a set of external components 900b illustrated in FIG. 2. In the depicted example, server computer 54 provides information, such as boot files, operating system images, and applications to the device computer 52. Server computer 54 can compute the information locally or extract the information from other computers on network 50. The server computer 54 may contain the query program 66. The server computer 54 may contain a semantic distance distribution profile score program 67. In an alternate embodiment, the semantic distance distribution profile score program 67 can be located on the client computer 52.

Program code and programs such as query program 66 and semantic distance distribution profile score program 67 may be stored on at least one of one or more computer-readable tangible storage devices 830 shown in FIG. 2, on at least one of one or more computer-readable portable tangible storage devices 936 as shown in FIG. 2, or on storage unit 53 connected to network 50, or may be downloaded to a device computer 52 or server computer 54, for use. For example, program code and programs such as query program 66 and semantic distance distribution profile score program 67 may be stored on at least one of one or more computer-readable tangible storage devices 830 on server computer 54 and downloaded to device computer 52 over network 50 for use. Alternatively, server computer 54 can be a web server, and the program code, and programs such as query program 66 and semantic distance distribution profile score program 67 may be stored on at least one of the one or more storage devices 830 on server computer 54 and accessed device computer 52. In other exemplary embodiments, the program code, and programs such as query program 66 and semantic distance distribution profile score program 67 may be stored on at least one of one or more computer-readable tangible storage devices 830 on device computer 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

The client computer 52 and the server computer 54 are in communication with at least one repository 53a-53n. The repositories contain corpuses with a predefined taxonomy and/or ontology. The taxonomy and/or ontology may be based on one or more of geographic provenance, cultural provenance, and demographic provenance.

The geographic provenance includes a taxonomy and/or ontology which includes regional uses of terms and names. For example, the use of "soda" versus "pop". The cultural provenance includes different cultural uses of terms, regardless of geographical location. The demographic provenance includes differing uses of terms based upon factors such as age and gender.

FIG. 2 illustrates internal and external components of a device computer 52 and server computer 54 in which illustrative embodiments may be implemented. In FIG. 2, a device computer 52 and a server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and query program 66 and semantic distance distribution profile score program 67 are stored on one or more of the computer-readable tangible storage devices 830 for execution by one or more of the processors 820 via one or more of the RAMs 822 (which typically include cache memory). In the embodiment illustrated in FIG. 2, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Query program 66 and semantic distance distribution profile score program 67 can be stored on one or more of the computer-readable portable tangible storage devices 936, read via R/W drive or interface 832 and loaded into tangible storage device 830.

Each set of internal components 800a, 800b also includes a network adapter or interface 836 such as a TCP/IP adapter card. Query program 66 and semantic distance distribution profile score program 67 can be downloaded to the device computer 52 and server computer 54 from an external computer via a network (for example, the Internet, a local area network or other, wide area network) and network adapter or interface 836. From the network adapter or interface 836, query program 66 and semantic distance distribution profile score program 67 is loaded into tangible storage device 830. Query program 66 and semantic distance distribution profile score program 67 can be downloaded to the server computer 54 from an external computer via a network (for example, the Internet, a local area network or other, wide area network) and network adapter or interface 836. From the network adapter or interface 836, query program 66 and semantic distance distribution profile score program 67 is loaded into tangible storage device 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in computer-readable tangible storage device 830 and/or ROM 824).

Query program 66 and semantic distance distribution profile score program 67 can be written in various programming languages including low-level, high-level, object-oriented or non object-oriented languages. Alternatively, the functions of a query program 66 and semantic distance distribution profile score program 67 can be implemented in whole or in part by computer circuits and other hardware (not shown).

It is to be understood that although this disclosure includes a detailed description of a server computer and a client computer, the embodiment can also be executed via cloud computing in a cloud computing environment as an external application programming interface (API), whereby processing occurs on a cloud server and is accessed through API calls from various cloud nodes. It should be noted that embodiments of the present invention are capable of being implemented in conjunction with any other type of computing environment now known or later developed. While not shown, the semantic distance distribution profile scoring of a user problem statement from a query within a workload layer of the cloud computing environment.

Figure 3:
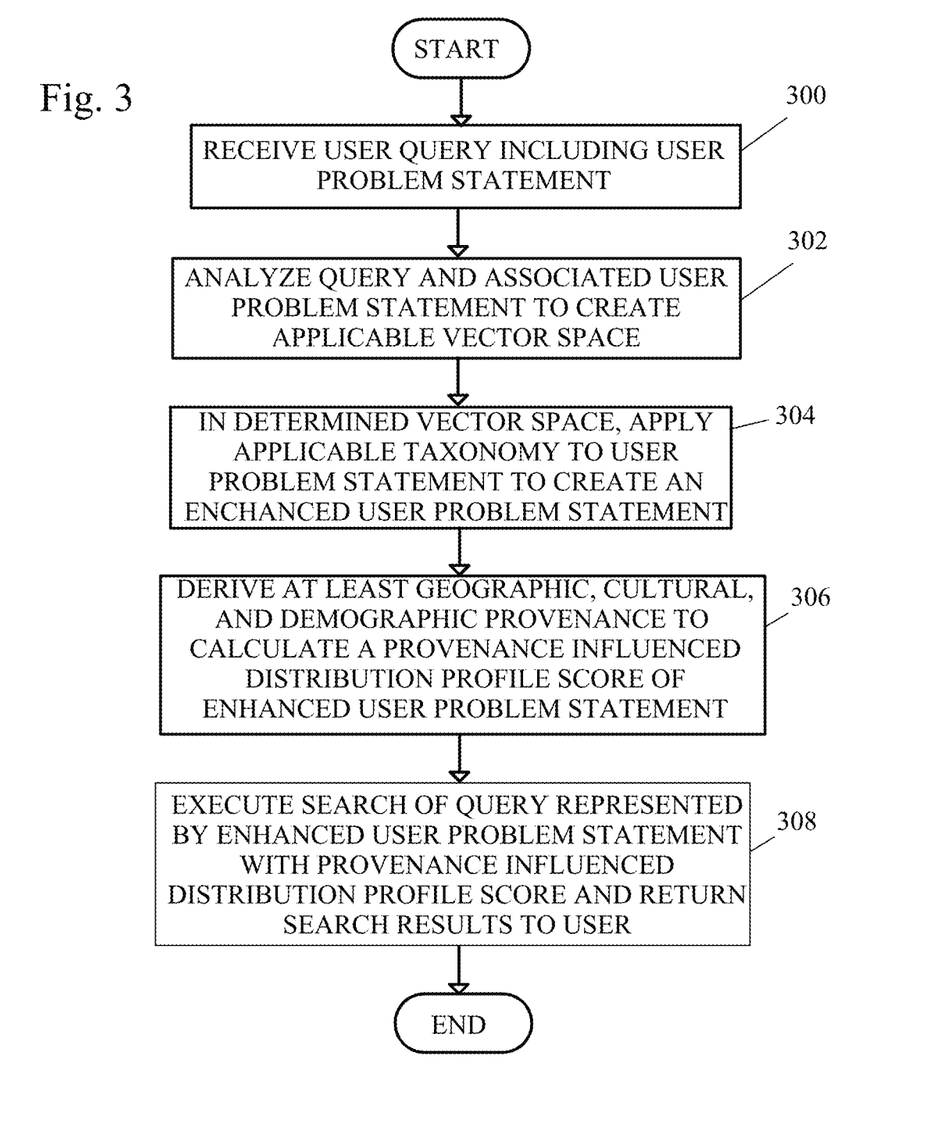
FIG. 3 shows a flow diagram of a method of semantic disambiguation utilizing provenance influenced distribution profile scores.

FIG. 3 shows a method of semantic disambiguation utilizing provenance influenced distribution profile scores.

In a first step, a user query is received (step 300), for example by the query program 66. The user query includes a user problem statement. A user problem statement is a sequence of words used as search keywords regarding a problem or questions from the user.

The query program 66 analyzes the query and associated user problem statement to create an applicable vector space containing values which represent the user problem statement (step 302), for example by the query program 66. The analysis of the query may be determined through cosine similarity to measure the "distance" between to two terms or clusters. To create the applicable vector space or linear space, a corpora of source data such as predefined taxonomy and/or ontology of words is loaded into a vector space library, and a vector space is created. The specific taxonomy or ontology loaded into the vector space library may be based on a preset policy. In an alternate embodiment, all taxonomies or ontologies available are loaded into a vector space library and a filter may be applied to the taxonomies or ontologies when a user problem statement is applied, for example in step 304. In another embodiment, multiple vector spaces can be used simultaneously, with one taxonomy per vector space being utilized.

A vector space is a set of possible vectors with each element or word of a user problem statement being a vector on n-dimensional space with some geometric structure satisfying some conditions or an n-dimensional space that represents all categorical data in a quantitative form. The vectors of the vector space each have a value. The vectors of the vector space can be added or multiplied through vector addition and a scalar multiplication. The operations of vector addition and scalar multiplication must satisfy certain axioms or requirements. The vector space can include additional structure, which may be a topology or ontology, allowing the consideration of issues of proximity and continuity.

In one embodiment, the determined vector space is a Banach space, a complete normed vector space which a metric that allows for the computation of a value of vector length and distance between vectors. In this space, vectors always converge to a well-defined limit that is within the space. The Banach space may be derived from Hilbert function spaces.

In the determined vector space, applicable taxonomy associated with the determined vector space is applied to the user problem statement to create an enhanced user problem statement (step 304), for example by the query program 66. The applicable taxonomy applies a hierarchical data structure of categorical values within the vector space and thus to the user problem statement and updates the values of the vectors of original user problem statement within the vector space to be enhanced vectors and values. For example, a vector associated with the user problem statement may have a size "x", however, after the taxonomy or ontology is applied to the vector associated with the problem statement, the vector has a size "y", with the difference in size of the vector altering the position of the vector in the vector space and distance between the vector and other nodes of the taxonomy or ontology.

The applicable taxonomy associated with the determined vector space is applied to the user problem statement by combining at least one taxonomical node of the taxonomy or ontology in a search engine index of a file system of data processing system 51 or a cloud server with the user statement to create an enhanced user problem statement. The search engine index preferably includes data associated with the corpus, for example in repositories 53a-53n. The applicable taxonomy augments the user problem statement to more closely define and represent the user's intent in the enhanced user problem statement. The search engine index of the file system can vary based on implementation. In one embodiment, the search engine index is an optimized data structure on a file system built for rapid retrieval.

A provenance influenced distribution profile score is calculated based on the enhanced values assigned to the enhanced user problem statement in the vector space to derive at least geographic, cultural and demographic provenance (step 306). The provenance can be derived based on the any influence on a digital entity. The influence on the digital entity is weighted and comprises a profile score. The influence can be determined by an agent which may be a user or an automated agent. The influence can be derived from the entity itself (e.g. author of a book and where the author is form), a phrase or high frequency phrase (repeated use of the word "boot of a car"), activity relating to the digital entity.

The profile score represents a semantic distance which measures how close or distant two units of language are in terms of their meaning or strength of an association of a given word with co-occurring words in text. For example, the profile score can be representative of at least one of a similarity between a sentence translated from one language to another, similarity of a word in a given context, the likelihood of a given spoken word given the content of the rest of the sentence within the vector space.

The profile score may be calculated using the following formula:

$$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}}$$

With:
A=Digital entity 1 in vector space
B=Digital entity 2 in vector space

For example, if the geographical profile represents Australia, the similarity metric between "Football" and "Soccer" will be much closer than if the profile is from the USA.

The search of the query represented by the enhanced user problem statement and associated provenance influenced distribution profile score is then executed and search results are returned to the user (step 308) and the method ends. The profile score influences one or more of the ranking of the search results returned to the user and various elements that compose a single search result returned to the user in response to the query. In one embodiment, prior to returning the search results to the user, the search results may be reordered based on the provenance influenced distribution profile score. In another embodiment, prior to returning the search results to the user, search results which are not similar or have low provenance influenced distribution profile score may not be included in the search results returned the user.

Figure 4:
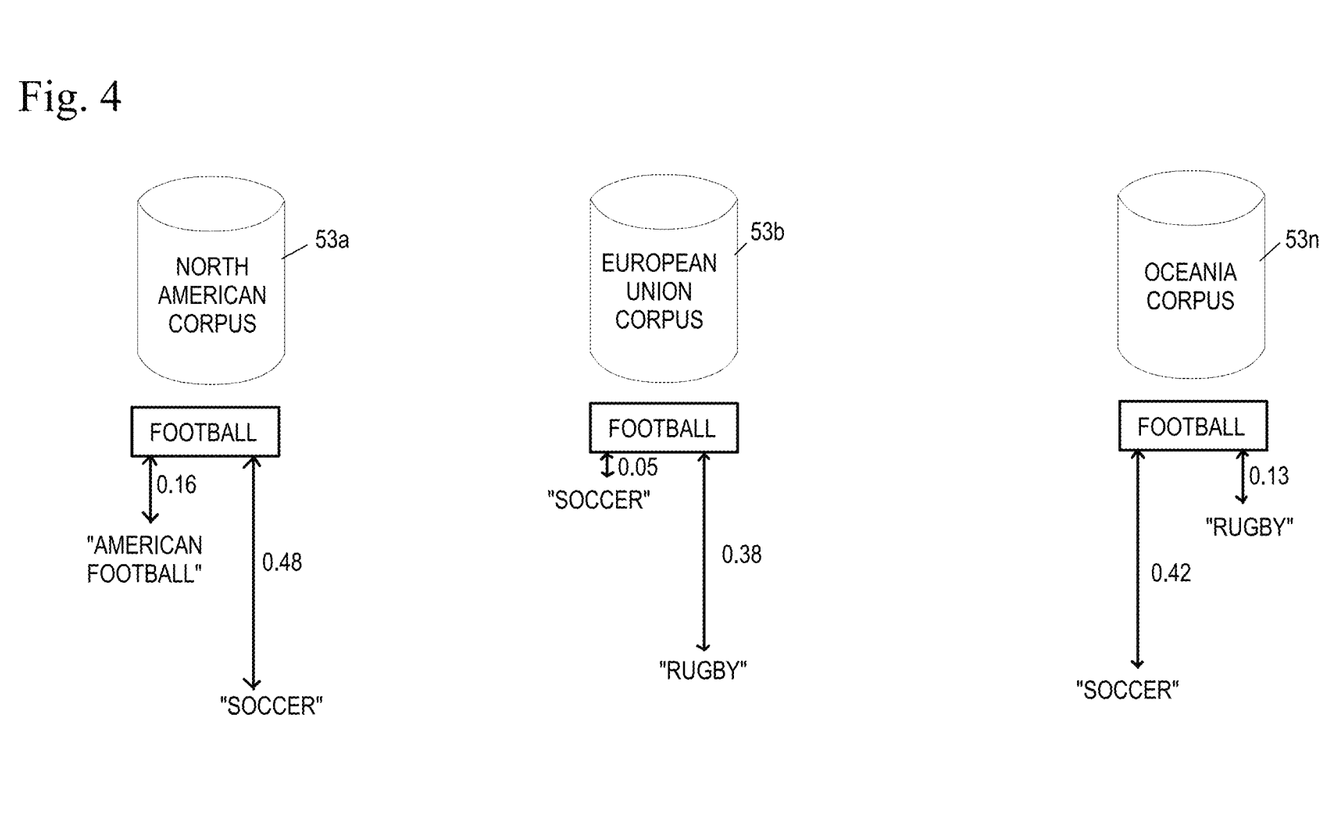
FIG. 4 shows an example of provenance influenced distribution profile scores.

Referring to FIG. 4, if a query with a user problem statement of "Where is the closest football game being played?" was received, the query program 66 analyzes the query and associated user problem statement to determine an applicable vector space. The applicable vector space could be time schedules associated with all sports games in a 25 mile radius from the user.

An applicable taxonomy is applied to the user problem statement of "Where is the closest football game being played?" to create an enhanced user problem statement. An example of applicable taxonomy or ontology is type of football, leagues, team names, schedules, and geographic location of game, distance from current location.

An example of an enhanced user problem statement is "Where is the closest (within 10 miles of current location) arena in which professional football, soccer, or rugby is being played?"

Calculation of a provenance influenced distribution profile score for the word "football" is shown in regarding to geographic and cultural provenance. In the North America corpus or repository 53a, the term "football" has a profile score of 0.16 relative to "American football". The term "football" has a profile score of 0.48 relative to "soccer", indicating that the term "football" in the user statement problem is closer to meaning "American football" than "soccer". In the European Union corpus or repository 53b, the term "football" has a profile score of 0.05 relative to "soccer". The term "football" has a profile score of 0.38 relative to "rugby", indicating that the term "football" in the user statement problem is closer to meaning "soccer" than "rugby". In the Oceania corpus or repository 53n, the term "football" has a profile score of 0.42 relative to "soccer". The term "football" has a profile score of 0.13 relative to "rugby". The term "football" has a profile score of 0.13 relative to "rugby", indicating that the term "football" in the user statement problem is closer to meaning "rugby" than "soccer". Based on the profile score, if a user is located in North America, the search results returned will be ranked with "American football" games within a certain number of miles from their location. If the user was from Australia, the search results may only contain "rugby" games in the area.

Demographic provenance can also be applied to "football" and can include which demographic of a population in certain geographical locations are more likely to watch rugby, soccer or American football.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of utilizing provenance influenced distribution profile scores to execute a search of a user query comprising the steps of:
   a computer receiving the user query including a user problem statement from a user;
   the computer analyzing, without an initial corpus of training data, the user query and associated user problem statement to create an applicable vector space with vectors having values representing the user problem statement;
   the computer applying a taxonomy to the vectors and the values representing the user problem statement within the applicable vector space to create an enhanced user problem statement represented within the applicable vector space by enhanced vectors and enhanced values, wherein the enhanced vectors are derived by applying the taxonomy to the vectors of the user problem statement;
   the computer measuring a semantic distance distribution profile score based on an analysis of the user problem statement with the vectors and the values in the taxonomy within the applicable vector space;
   the computer deriving a provenance from the taxonomy;
   the computer calculating a provenance influenced distribution profile score of the enhanced user problem statement based on the semantic distance distribution profile score, the enhanced values of the enhanced vectors of the enhanced user problem statement, and the provenance;
   the computer executing the search of the user query represented by the enhanced user problem statement and the provenance influenced distribution profile score;
   the computer ordering search results from the search based on the provenance influenced distribution profile score; and
   the computer returning the search results from the search to the user.

2. The method of claim 1, wherein the provenance includes geographic, cultural and demographic elements.

3. The method of claim 1, further comprising, prior to returning the search results to the user, the computer removing search results from the search results based on the provenance influenced distribution profile score.

4. The method of claim 1, further comprising, prior to returning the search results to the user, the computer ranking the search results based on the provenance influenced distribution profile score.

5. The method of claim 1, wherein application of the taxonomy to the vector space applies a hierarchical data structure of categorical values within the vector space.

6. The method of claim 1, wherein the vector space is provided as a service in a cloud environment.

7. The method of claim 1, wherein the vector space is Banach space.

8. The method of claim 7, wherein the Banach space is derived from Hilbert function spaces.

9. A computer program product for utilizing provenance influenced distribution profile scores to execute a search of a user query with a computer comprising at least one processor, one or more memories, one or more computer readable storage media, the computer program product comprising a computer readable storage medium having program instructions embodied therewith, the program instructions executable by the computer to perform a method comprising:
   receiving, by the computer, the user query including a user problem statement from a user;
   analyzing, by the computer, without an initial corpus of training data, the user query and associated user problem statement to create an applicable vector space with vectors having values representing the user problem statement;
   applying, by the computer, a taxonomy to the vectors and the values representing the user problem statement within the applicable vector space to create an enhanced user problem statement represented within the applicable vector space by enhanced vectors and enhanced values;
   measuring, by the computer, a semantic distance distribution profile score based on an analysis of the user problem statement with the vectors and the values in the taxonomy within the applicable vector space;
   deriving, by the computer, a provenance from the taxonomy;
   calculating, by the computer, a provenance influenced distribution profile score of the enhanced user problem statement based on the semantic distance distribution profile score, the enhanced values of the enhanced vectors of the enhanced user problem statement, and the provenance;
   executing, by the computer, the search of the user query represented by the enhanced user problem statement and the provenance influenced distribution profile score;
   ordering, the computer, search results from the search based on the provenance influenced distribution profile score; and
   returning, by the computer, the search results from the search to the user.

10. The computer program product of claim 9, wherein the provenance includes geographic, cultural and demographic elements.

11. The computer program product of claim 9, further comprising, prior to returning the search results to the user, removing, by the computer, search results from the search results based on the provenance influenced distribution profile score.

12. The computer program product of claim 9, further comprising, prior to returning the search results to the user, ranking, by the computer, the search results based on the provenance influenced distribution profile score.

13. The computer program product of claim 9, wherein application of the taxonomy to the vector space applies a hierarchical data structure of categorical values within the vector space.

14. The computer program product of claim 9, wherein the vector space is provided as a service in a cloud environment.

15. The computer program product of claim 9, wherein the vector space is Banach space.

16. The computer program product of claim 15, wherein the Banach space is derived from Hilbert function spaces.

17. A computer system for utilizing provenance influenced distribution profile scores to execute a search of a user query comprising a computer executing the search of the user query, comprising at least one processor, one or more memories, one or more computer readable storage media having program instructions executable by the computer to perform the program instructions comprising:

receiving, by the computer, the user query including a user problem statement from a user;

analyzing, by the computer, without an initial corpus of training data, the user query and associated user problem statement to create an applicable vector space with vectors having values representing the user problem statement;

applying, by the computer, a taxonomy to the vectors and the values representing the user problem statement within the applicable vector space to create an enhanced user problem statement represented within the applicable vector space by enhanced vectors and enhanced values, wherein the enhanced vectors are derived by applying the taxonomy to the vectors of the user problem statement;

measuring, by the computer, a semantic distance distribution profile score based on an analysis of the user problem statement with the vectors and the values in the taxonomy within the applicable vector space;

deriving, by the computer, a provenance from the taxonomy;

calculating, by the computer, a provenance influenced distribution profile score of the enhanced user problem statement based on the semantic distance distribution profile score, the enhanced values of the enhanced vectors of the enhanced user problem statement, and the provenance;

executing, by the computer, the search of the user query represented by the enhanced user problem statement and the provenance influenced distribution profile score;

the computer ordering search results from the search based on the provenance influenced distribution profile score; and returning, by the computer, the search results from the search to the user.

18. The computer system of claim 17, wherein the provenance includes geographic, cultural and demographic elements.

19. The computer system of claim 17, further comprising, prior to returning the search results to the user, removing, by the computer, search results from the search results based on the provenance influenced distribution profile score.

20. The computer system of claim 17, further comprising, prior to returning the search results to the user, ranking, by the computer, the search results based on the provenance influenced distribution profile score.

* * * * *